United States Patent [19]

Casper et al.

[11] 4,438,348
[45] Mar. 20, 1984

[54] TEMPERATURE COMPENSATED AVALANCHE PHOTODIODE OPTICAL RECEIVER CIRCUIT

[75] Inventors: Paul W. Casper, Melbourne; William B. Ashley, Indialantic, both of Fla.

[73] Assignee: Harris Corporation, Cleveland, Ohio

[21] Appl. No.: 949,231

[22] Filed: Oct. 6, 1978

[51] Int. Cl.³ .......................... H03K 3/42; H01J 7/24
[52] U.S. Cl. .................................. 307/310; 307/311; 250/238; 328/2
[58] Field of Search ............... 328/2; 307/311, 310 G; 250/211.5, 238; 322/26, 28

[56] References Cited

U.S. PATENT DOCUMENTS

| | | | |
|---|---|---|---|
| 3,293,540 | 12/1966 | Silard et al. | 307/310 |
| 3,480,781 | 11/1969 | Mandalaka | 350/238 |
| 3,676,686 | 7/1972 | Allington | 307/311 |
| 3,705,316 | 12/1972 | Burrous et al. | 307/311 |
| 3,755,679 | 8/1973 | Otsuka | 307/311 |
| 4,038,555 | 7/1977 | Freeman | 250/238 |
| 4,096,382 | 6/1978 | Namata et al. | 328/2 |

*Primary Examiner*—Stanley D. Miller
*Assistant Examiner*—B. P. Davis
*Attorney, Agent, or Firm*—Antonelli, Terry & Wands

[57] ABSTRACT

A photodiode receiver circuit having self-contained automatic gain control and which is temperature compensated over a wide operating range contains a resistor coupled in series between a bias power supply and one end of an avalanche photodiode. Self-generated AGC action results from the fact that the gain of an avalanche photodiode increases as the bias voltage applied across the diode increases. As the light intensity received by the diode increases, there is a corresponding increase in the current flow through the diode and the series-connected resistor. The consequential increase in IR drop across the resistor decreases the bias voltage across the diode, so that the gain of the diode is reduced. Through this action, the dynamic range of optical input of the photodiode will be increased for a fixed dynamic range of electrical output.

Temperature compensation is achieved by coupling a temperature-sensitive voltage divider circuit between the bias voltage supply and the gain-controlling resistor. This voltage divider network may include a thermistor coupled in parallel with one resistor component of a resistor divider that is connected to a bias voltage source. The value of the parallel resistor is chosen to match the thermistor's characteristic to the voltage versus temperature characteristic of the APD so that a temperature-compensated bias voltage reference, to which the gain-controlling resistor is connected, is available over a wide temperature range (e.g. −40° C. to +60° C.). This temperature compensation allows the avalanche photodiode to be operated at a nearly constant available gain across this range and prevents the diode from being damaged by too high a bias voltage.

13 Claims, 13 Drawing Figures

TEMPERATURE COMPENSATED AVALANCHE PHOTODIODE OPTICAL RECEIVER CIRCUIT

FIELD OF THE INVENTION

The present invention relates to optical communication systems and is particularly directed to a scheme for improving the operation of an optical receiver employing an avalanche photodiode as an opto-electronic transducer.

BACKGROUND OF THE INVENTION

In optical communication systems, such as those which transmit data over optical fiber cable links, the opto-electronic transducer to which the light transmitted by an optical fiber is coupled may take the form of an avalanche photodiode. The photodiode is normally biased to operate over a prescribed range wherein it converts optical input signals transmitted over the fibers into an electrical current output proportional to the optical signals. An important criterion in achieving accurate photo-current conversion is the operational characteristics of the photodiode. As these characteristics are affected by both environmental variations, such as temperature fluctuations, and electrical circuit variations, such as power supply voltage drifts, some means must be provided to provide the necessary compensation in an effort to obtain reliable operation of the photodiode. Among various configurations that have been proposed to deal with variations in optical system parameters are those described in the United States Patents to Chilton U.S. Pat. No. 3,626,188, Rose U.S. Pat. No. 3,657,543, Maione et al. U.S. Pat. No. 4,019,048, Coleby U.S. Pat. No. 3,793,522, Dahlinger U.S. Pat. No. 4,001,614, and Andersson et al. U.S. Pat. No. 4,015,188. Similarly, the United States . Patent to Burrous et al. U.S. Pat. No. 3,705,316 describes circuitry for providing temperature compensation for a light source employing a light emitting diode. Unfortunately, the various implementations described in the above literature are, for the most part, complex and do not practically provide the complete gain control and overall compensation that is necessary in an avalanche photodiode receiver.

SUMMARY OF THE INVENTION

In accordance with the present invention, there is provided an improved photodiode receiver circuit having self-contained automatic gain control and which is temperature compensated over a wide operating range. For this purpose, pursuant to the present invention, coupled in series between a bias power supply and one end of an avalanche photodiode there is a resistor of a selected value that effectively provides automatic gain control (AGC) for the photodiode. This self-generated AGC action results from the fact that the gain of an avalanche photodiode increases as the bias voltage applied across the diode increases. As the light intensity received by the diode increases, there is a corresponding increase in the current flow through the diode and the series-connected resistor. The consequential increase in IR drop across the resistor decreases the bias voltage across the diode, so that the gain of the diode is reduced. Through this action, the dynamic range of optical input of the photodiode will be increased for a fixed dynamic range of electrical output.

Temperature compensation is achieved by coupling a temperature-sensitive voltage divider circuit between the bias voltage supply and the gain-controlling resistor. This voltage divider network may include a thermistor coupled in parallel with one resistor component of a resistor divider that is connected to a bias voltage source. The value of the parallel resistor is chosen to match the thermistor's characteristic to the voltage versus temperature characteristic of the avalanche photodiode, so that a temperature-compensated bias voltage reference, to which the gain-controlling resistor is connected, is available over a wide temperature range (e.g. −40° C. to +60° C.). This temperature compensation allows the avalanche photodiode to be operated at a nearly constant available gain across this range and prevents the diode from being damaged by too high a bias voltage.

DETAILED DESCRIPTION

Figure 1:
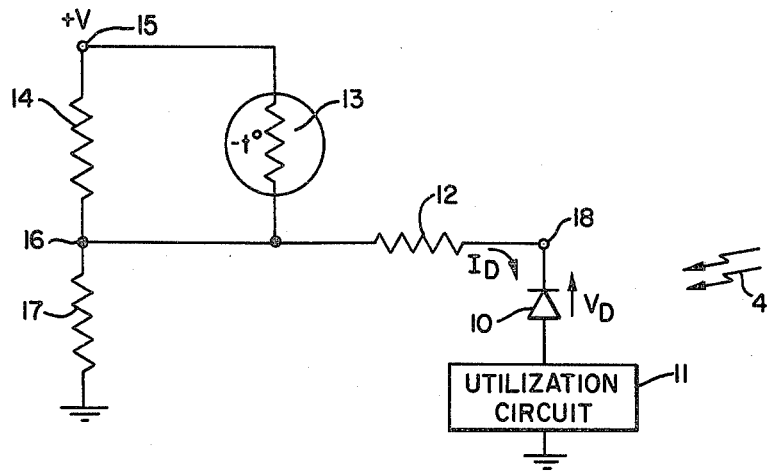
FIG. 1 is a schematic diagram of a temperature-compensated avalanche photodiode optical receiver circuit.

Referring now to FIG. 1 of the drawings, wherein there is shown a schematic diagram of the avalanche photodiode optical receiver circuit in accordance with the present invention, an avalanche photodiode 10, per se, may be coupled, by way of suitable optical elements (not shown), to receive impinging light 4, the variation in which is to be converted into a useful current signal $I_D$ flowing through a diode. The anode of the diode may be connected to a suitable utilization circuit 11, to which the current is supplied. The cathode of the diode 10 is coupled to a terminal 18, to which one end of a series resistor 12 is connected. The other end of resistor 12 is connected to a voltage bias terminal 16, which forms the tap point of a voltage divider circuit. The voltage divider circuit is comprised of a pair of resistors 14 and 17, connected in series between a voltage source +V supplied to a terminal 15 and a suitable reference terminal, such as ground, as shown. Connected in parallel with resistor 14 is a thermistor 13, having a negative temperature coefficient characteristic. Before describing the temperature compensation characteristics of the circuit depicted in FIG. 1, the self-generated AGC provided by resistor 12 will be explained with reference to FIG. 2.

Figure 2:
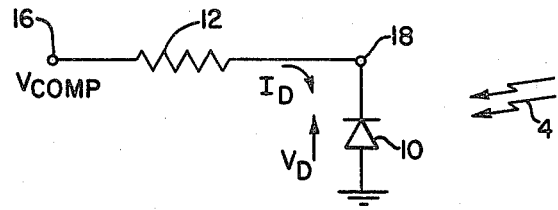
FIG. 2 is a schematic diagram of a portion of FIG. 1.

FIG. 2 shows a portion of the circuitry depicted in FIG. 1 for the purposes of explaining the self-generated automatic gain control feature of the present invention. For a compensated voltage bias supplied at terminal 16, there will be supplied a suitable bias voltage across resistor 12 and avalanche photodiode 10. In the absence of resistor 12, the current flowing through avalanche photodiode 10, in response to an optical input 4, would vary as shown along line 31 in FIG. 3. Namely, as the optical input Po increases, the current output $I_D$ of diode 10 increases up to an acceptable level $I_D'$, beyond which the receiver distorts to too great a degree for accurate photoconversion. An increase in the dynamic range of the photodiode may be achieved by the insertion of an AGC compensating resistor 12 between terminals 16 and 18, so as to change the current output versus optical input response characteristic to that shown along line 32. More specifically, in an avalanche photodiode, the gain increases for an increasing bias voltage connected thereacross, namely a bias voltage $V_D$ at terminal 18. In response to an optical input 4, the current $I_D$ through diode 10 increases as the light intensity increases. The increase in the magnitude of the current $I_D$ contributes to an increase in the voltage drop across resistor 12, so that the magnitude of the voltage $V_D$ at terminal 18 is decreased. In other words, with an increase in optical input, as the current flowing through the diode increases, the corresponding decrease in the bias voltage across the diode causes a decrease in the gain, so that there is effectively obtained a self-generated automatic gain control by inserting the resistor 12 is series between the voltage supply terminal 16 and the cathode of avalanche photodiode 10. Thus, there is effectively obtained an increase in the dynamic range from Po1, that produces the current $I_D'$, for a diode without the AGC resistor, to Po2 at which current $I_D'$ is produced when the AGC resistor is employed.

Figure 3:
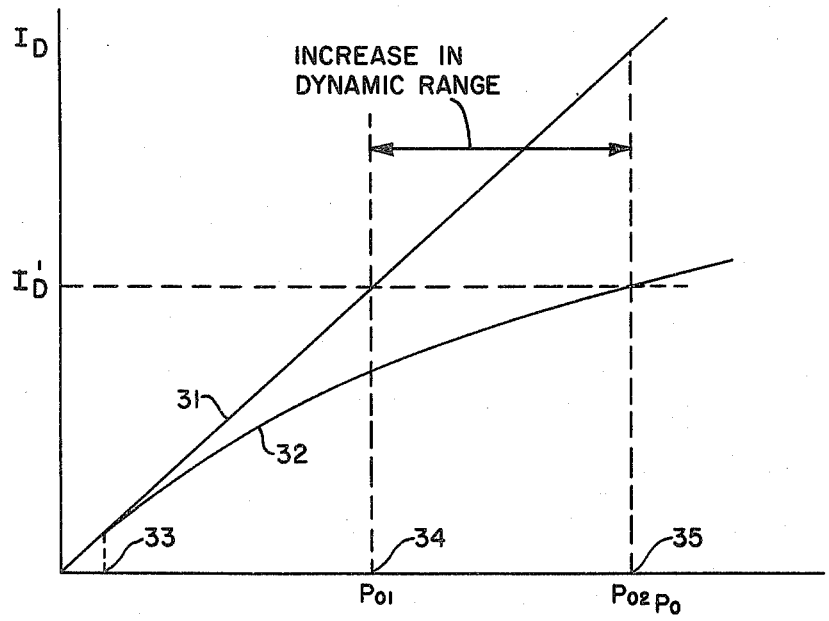
FIG. 3 is a graph depicting the variation of current versus optical input of an avalanche photodiode receiver circuit.

Observation of the variation in gain (which corresponds to the slope of the characteristic illustrated in FIG. 3) shows that at an initial point 33, for very small optical inputs, the current flowing through the avalanche photodiode in response to such small optical inputs is extremely small, so that the bias voltage $V_D$ across the photodiode is nearly at the maximum available bias voltage, i.e. that applied to terminal 16. This voltage may be chosen to be the maximum bias voltage that may be applied across diode 10 without the latter being damaged. However, as the current through diode 10 increases in response to larger optical inputs to photodiode 10, the increasing IR drop across resistor 12 will reduce the voltage at terminal 18. At point 34 shown in FIG. 3, the optical power within optical input beam 4 is of sufficient intensity to cause the magnitude of current $I_D$ to have reduced the voltage $V_D$ across photodiode 10, so that the slope of the characteristic, namely the gain, has decreased. This decrease in gain continues as the optical input increases, as shown at point 35, the dynamic range of the diode 10 having been increased accordingly.

Considering now the temperature compensation aspects of the present invention, the function of resistors 14 and 17 and thermistor 13, shown in FIG. 1, will be explained. In order to maintain operation of the avalanche photodiode circuit over a large temperature range, for example from $-40°$ C. to $+60°$ C., consideration must be given to the fact that the maximum voltage that may be applied across the photodiode without damage is temperature dependent. In addition, it is desirable to maintain a relatively constant available gain over the above variable temperature range. (It is noted that the actual gain may be somewhat decreased by the automatic gain control action of resistor 12, described above.)

Considering now the operation of the voltage divider thermistor network, thermistor 13 has a negative temperature coefficient so that, as the temperature decreases, the resistance of thermistor 13 increases, thereby lowering the voltage at terminal 16, due to the voltage division across the parallel combination of resistor 14 and thermistor 13 and resistor 17. Without resistor 14, the voltage at terminal 16 would effectively track the maximum voltage that may be applied to diode 10 between a limited temperature range of +25 degrees C. to +60 degrees C. At lower temperatures, the resistance of the thermistor 13 increases extremely rapidly so that the voltage at terminal 16 would drop to too low a value. However, by employing the parallel resistor 14, this sharp increase in resistance is compensated. At the lower end of the temperature range, namely at very cold temperatures in the neighborhood of the lower limit, the resistance of resistor 14 is much less than that of thermistor 13, so that the resistance of thermistor 13 can be ignored and the action of the voltage divider network is effectively obtained by resistors 14 and 17. As the temperature increases, the difference between resistor 14 and thermistor 13 decreases and once the temperature reaches the neighborhood of $+20$ degrees C., the resistance of thermistor 13 becomes considerably less than that of resistor 14, so that the potential at terminal 16 effectively tracks the maximum voltage that may be applied across the avalanche photodiode to the upper limit of the temperature range, namely to $+60°$ C.

As a practical consideration, since the voltage applied at terminal 15 is typically on the order of hundreds of volts, the values of resistors 14 and 17 should be maintained large in order to reduce power consumption.

In order to maintain proper AGC action provided by resistor 12, the effective resistance provided by resistors 14 and 17 and thermistor 13 should be less than that of resistor 12 for the cold temperature limit. Accordingly, as the temperature increases, most of the AGC action is still effective. This requires that the resistance values of resistors 14 and 17 be held at a relatively low value so that power consumption will be somewhat increased for increased AGC performance.

As will be appreciated from the foregoing description, in accordance with the present invention, the temperature compensation provided by resistor 14 and 17 and thermistor 13 allows the avalanche photodiode 10 to be operated at a nearly constant available gain over a wide temperature range from $-40°$ C. to $+60°$ C. and will prevent the avalanche photodiode from becoming damaged by the application of too high a bias voltage.

The insertion of only a single component, namely resistor 12, between the cathode of avalanche photodiode 10 and voltage terminal 16 enables the receiver to maintain full bandwidth and increases the optical dynamic range of 12 to 18 dB.

In determining the value of gain control resistor 12, consideration must be given to the effects of varying the magnitude of the resistor. It would appear that for larger and larger values of resistor 12, a greater automatic gain control effect would be obtained. However, if the magnitude of resistor 12 is increased to too large a value, the nonimal operating optical power level will cause the voltage drop across the avalanche photodiode to decrease so far that "breakthrough" will occur. "Breakthrough" is a property of an avalanche photodiode that when operated at too low a gain its bandwidth (frequency response) drops rapidly. Fortunately, this breakthrough effect does not cause permanent damage to the photodiode and normal operation will resume once the optical input is brought back down to the normal operating range. Breakthrough occurs easiest at lower temperatures, so that the lower temperature limit determines the maximum value of resistor 12 that can be used for a given maximum operating optical input power.

While we have described and explained an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. An avalanche photodiode circuit comprising:
   an avalanche photodiode for receiving a light signal and generating an electrical output in response thereto;
   a thermistor-containing voltage divider network; and
   a first resistor; and wherein
   said voltage divider network is electrically separated from said avalanche photodiode except for said first resistor which is connected therebetween.

2. An avalanche photodiode circuit according to claim 1, wherein said thermistor-containing voltage divider network includes a negative temperature coefficient thermistor.

3. An avalanche photodiode circuit according to claim 1, wherein said voltage divider network comprises a pair of resistor sections connected in series with one another between first and second voltage reference terminals, the junction of said first and second resistor sections being connected to said first resistor.

4. An avalanche photodiode circuit according to claim 3, wherein the junction of said first and second resistor sections is connected to the end of said first resistor opposite to the end thereof connected to said avalanche photodiode.

5. An avalanche photodiode circuit according to claim 4, wherein said thermistor-containing voltage divider network includes a negative temperature coefficient thermistor.

6. An avalanche photodiode circuit according to claim 5, wherein said voltage divider network comprises second and third resistors connected in series between said first and second voltage reference terminals, said thermistor being connected in parallel with said second resistor.

7. An avalanche photodiode circuit according to claim 6, wherein the resistance of said thermistor $R_{TH}$, relative to that $R_2$ second resistor in parallel therewith, is such that $R_{TH} >> R_2$ for temperatures at the lower end of a prescribed temperature range and $R_2 >> R_{TH}$ for temperatures at the upper end of said prescribed temperature range.

8. An opto-electrical conversion circuit comprising:
   an opto-electrical conversion element for receiving a light signal input and generating an electrical output in response thereto;
   a gain control element; and
   a negative temperature coefficient variable resistance network connected to a source of bias potential; and wherein
   said network is electrically separated from said opto-electrical conversion element except for said gain control element which is connected therebetween for controlling the voltage bias applied across said conversion element in response to the electrical output generated in accordance with the light signal applied to said conversion element, whereby the gain available to said conversion element is maintained substantially constant over a prescribed temperature range.

9. An opto-electrical conversion circuit according to claim 8, wherein said opto-electrical conversion element comprises means for converting a light signal input into an electrical current output proportional thereto.

10. An opto-electrical conversion circuit according to claim 9, wherein said gain control element comprises a resistor element.

11. An opto-electrical conversion circuit according to claim 8, wherein said negative temperature coefficient variable resistance network comprises first and second resistors connected in series between said source of bias potential and a reference potential terminal, and a negative temperature coefficient thermistor connected in parallel with one of said first and second resistors.

12. An opto-electrical conversion circuit according to claim 10, wherein said negative temperature coefficient variable resistance network comprises first and second resistors connected in series between said source of bias potential and a reference potential terminal, and a negative temperature coefficient thermistor connected in parallel with one of said first and second resistors.

13. An opto-electrical conversion circuit according to claim 10, wherein said opto-electrical conversion element comprises an avalanche photodiode.

* * * * *